United States Patent [19]
Martinie

[11] Patent Number: 5,373,636
[45] Date of Patent: Dec. 20, 1994

[54] BEARING REMOVAL SYSTEM

[75] Inventor: Howard M. Martinie, Simpsonville, S.C.

[73] Assignee: Reliance Electric Industrial Company, Greenville, S.C.

[21] Appl. No.: 957,666

[22] Filed: Oct. 7, 1992

[51] Int. Cl.⁵ .......................... B23P 19/04; F16D 1/06
[52] U.S. Cl. .................... 29/898.08; 29/256; 29/426.5; 403/16; 403/370; 403/371
[58] Field of Search ................ 29/239, 244, 252, 256, 29/257, 426.5, 898.08; 403/16, 370, 371

[56] References Cited

U.S. PATENT DOCUMENTS

| | | | |
|---|---|---|---|
| 1,843,463 | 2/1932 | Tawresey | 29/898.08 |
| 2,043,272 | 6/1936 | Wallgren | 403/371 X |
| 3,033,597 | 5/1962 | Miller | 403/16 X |
| 3,497,274 | 2/1970 | Yardley | |
| 3,953,142 | 4/1976 | Price et al. | 403/371 |
| 4,364,687 | 12/1982 | Adell | 403/16 X |
| 5,009,539 | 4/1991 | Muellenberg | 403/371 X |
| 5,011,306 | 4/1991 | Martinie | |
| 5,067,847 | 11/1991 | Muellenberg | 403/371 X |

FOREIGN PATENT DOCUMENTS 235366 9/1987 European Pat. Off. .
2120360 11/1983 United Kingdom .

*Primary Examiner*—Mark Rosenbaum
*Assistant Examiner*—S. Thomas Hughes
*Attorney, Agent, or Firm*—Dority & Manning

[57] ABSTRACT

Device for removing a bearing assembly from a shaft including a tapered adapter for securing a bearing assembly to a shaft that includes a radial opening therethrough extending along the length thereof and further defines a groove extending about at least a portion of the circumference of the adapter and being located proximate the large end of the adapter. The device also includes a removal ring with a holding lip for mating with the groove extending about the circumference of the tapered adapter and is provided so as to apply a separating force between the bearing assembly and the removal ring for releasing a bearing assembly from a shaft.

15 Claims, 2 Drawing Sheets

BEARING REMOVAL SYSTEM

BACKGROUND OF THE INVENTION

The present invention relates to the use of tapered adapters for fitting bearings, pulleys, sheaves and the like to shafts, and more particularly to an improved method and apparatus for removing a bearing assembly or the like from a shaft secured through a tapered adapter. While other devices are contemplated, a bearing assembly is utilized in the specification for illustrative purposes.

It is well known in the art to employ split tapered adapters to secure bearings, pulleys, sheaves and the like to shafts. Generally, the tapered adapter is received about a shaft and has a tapered outer surface with threads on the smaller end. The bearing assembly has a tapered bore and is forced up the adapter by tightening a locknut a nut that is threaded on the threads of the adapter. This closes the adapter around the shaft and into the bearing bore until there is a metal to metal fit between the shaft, adapter and bearing assembly. Further tightening of the locknut forces the bearing up the adapter taper expanding the inner ring of the bearing to the equivalent of several thousands of an inch press fit. The inner ring thus has a tight fit with the resulting high pressure against the adapter. The result of the high pressure, low angle of taper on the adapter and the coefficient of friction of steel on steel results in high force required to remove the bearing. In addition, fretting corrosion often develops at the bearing bore/adapter interface further increasing the force required to remove the bearing.

Since there is no convenient way to apply force from the shaft to the bearing face, it is frequently necessary to destroy the bearing and damage or risk damage to the shaft during repairs to a system. Since the shafts are not of a single diameter and are of varying lengths, the use of standard removal tools such as gear pullers is not practical. During field service, the use of a cutting torch is commonly used to remove the bearing, thus completely destroying the bearing and possibly the shaft.

SUMMARY OF THE INVENTION

The present invention recognizes and addresses the foregoing disadvantages, and others of prior art constructions and methods.

Accordingly, it is an object of the present invention to provide an improved device for removing a bearing assembly or the like from a shaft.

It is another object of the present invention to provide an improved tapered adapter that facilitates removal of a bearing assembly or the like.

It is a further object of the present invention to provide a tool for removing a bearing assembly or the like from a shaft.

Still another object of the present invention is to provide an improved method for removing a bearing assembly or the like from a shaft.

It is another object of the present invention to provide a method and device for removing a bearing assembly or the like from a shaft that minimizes damage to both the bearing assembly and the shaft.

Still another object of the present invention is to provide a bearing removal system that minimizes the time required to remove a bearing from a shaft.

These and other objects of the present invention are achieved by providing an improved device for removing a bearing assembly from a shaft. The device includes a tapered adapter for receipt on a shaft for securing a bearing assembly to the shaft, the tapered adapter including a first end of lesser diameter and a second end of greater diameter than the diameter of the first end, the first and second ends having a tapered outer surface extending therebetween. The adapter defines a radial opening therethrough extending along the length thereof and further defines a groove extending about at least a portion of the circumference of the adapter, the groove being located proximate the second end of the adapter. The device further includes a removal ring including a plurality of segments adapted to be secured together into a rigid member, the ring including a holding lip for mating with the groove extending about the circumference of the tapered adapter and means for applying a separating force between the removal ring and the bearing assembly whereby the bearing assembly will be released from the tapered adapter.

The means for applying a separating force may include a plurality of threaded holes defined in the removal ring for receipt of a plurality of threaded members therethrough, the holes being located so that threaded members received therethrough will engage the inner ring of the bearing assembly, and a plurality of threaded members threadingly engaged in the holes so that the removal ring can be placed on a tapered adapter with the holding lip engaging the groove and the threaded members rotated into engagement with the inner ring and thereafter further rotated so that the removal ring will cause the tapered adapter to disengage the bearing assembly.

These and other objects of the present invention are also achieved by providing an improved tapered adapter for receipt on a shaft for securing a bearing assembly or the like to the shaft, the tapered adapter comprising a first end of lesser diameter and a second end of greater diameter than the diameter of the first end, the first and second ends having a tapered outer surface extending therebetween, the adapter defining a radial opening therethrough extending along the length thereof. The improved adapter further includes a groove extending around at least a portion of the circumference of the adapter, the groove being located proximate the second end of the adapter so that the groove can be engaged to assist in the separation of the bearing assembly from the tapered adapter when desired.

These and other objects are also achieved by providing a tool for removing a bearing assembly or the like from a shaft to which the bearing assembly is secured through a tapered adapter with a groove therein, the tool comprising a removal ring with a plurality of segments adapted to be secured together into a rigid member, the ring including a holding lip for mating with a groove extending about the circumference of a tapered adapter. The tool further includes means for applying a separating force between the removal ring and the bearing assembly whereby the bearing assembly will be released from the tapered adapter.

In addition, these and other objects are also achieved by providing an improved method for removing a bearing assembly from a shaft where the bearing assembly is secured to the shaft through a tapered adapter, the tapered adapter having a first end of lesser diameter and a second end of greater diameter than the diameter of the first end, the first and second ends having a tapered outer surface extending therebetween, and the adapter defining a groove extending about at least a portion of its circumference and located proximate the second end of the tapered adapter, the method comprising the steps of placing a removal ring with a holding lip onto the second end of the tapered adapter so that the holding lip mates with the groove defined in the tapered adapter, and applying a separating force between the removal ring and the bearing assembly to force the tapered adapter and bearing assembly apart.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including referece to the accompanying figures, in which.

Figure 1:
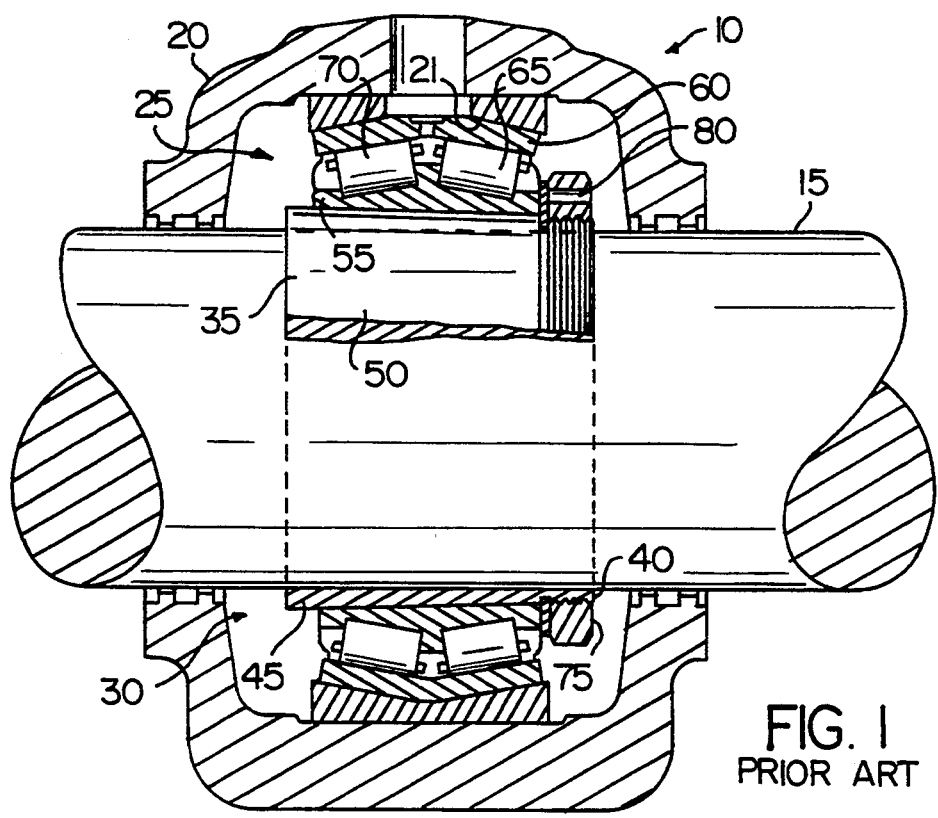
FIG. 1 illustrates a shaft and bearing arrangement utilizing a conventional split tapered adapter.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Referring to FIG. 1, a pillow block arrangement 10 is illustrated receiving a shaft 15 therethrough. Pillow block arrangement 10 includes a pillow block housing 20 containing a bearing assembly 25 secured to the shaft through securing means generally illustrated at 30. Securing means 30 in FIG. 1 includes a conventional tapered adapter 35. Tapered adapter 35 includes a first end 40 and a second end 45. First end 40 is of a lesser diameter than second end 45. The first and second ends have a tapered outer surface 50 extending therebetween. The tapered adapter defines a radial opening therethrough extending along the length of the tapered adapter. This radial opening, or slit, allows the tapered adapter to contract as a device is moved along its surface for seating as is well known in the art.

Bearing assembly 25 includes an inner race or ring 55 and an outer race or ring 60. Located between the inner and outer rings 55 and 60 are two sets of roller bearings illustrated at 65 and 70. It should be understood by one skilled in the art that any type of roller bearing such as tapered, spherical, cylindrical or ball could be utilized. The pillow block housing 20 includes a spherical portion 21 that is adapted to mate with the outer surface of the outer ring 60 to allow the bearing assembly to align in the pillow block housing. The first end 40 of tapered adapter 35 is threaded as illustrated at 75 and is adapted to be engaged by locknut 80 for moving the bearing assembly 25 up the tapered adapter for seating as is well known. This locknut tapered adapter arrangement could be of any known type such as that disclosed in U.S. Pat. No. 5,011,306 entitled "Apparatus For Mounting A Bearing Or Other Device And Tapered Adapter Onto A Shaft", the entire disclosure of which patent is hereby incorporated by reference.

Figure 2:
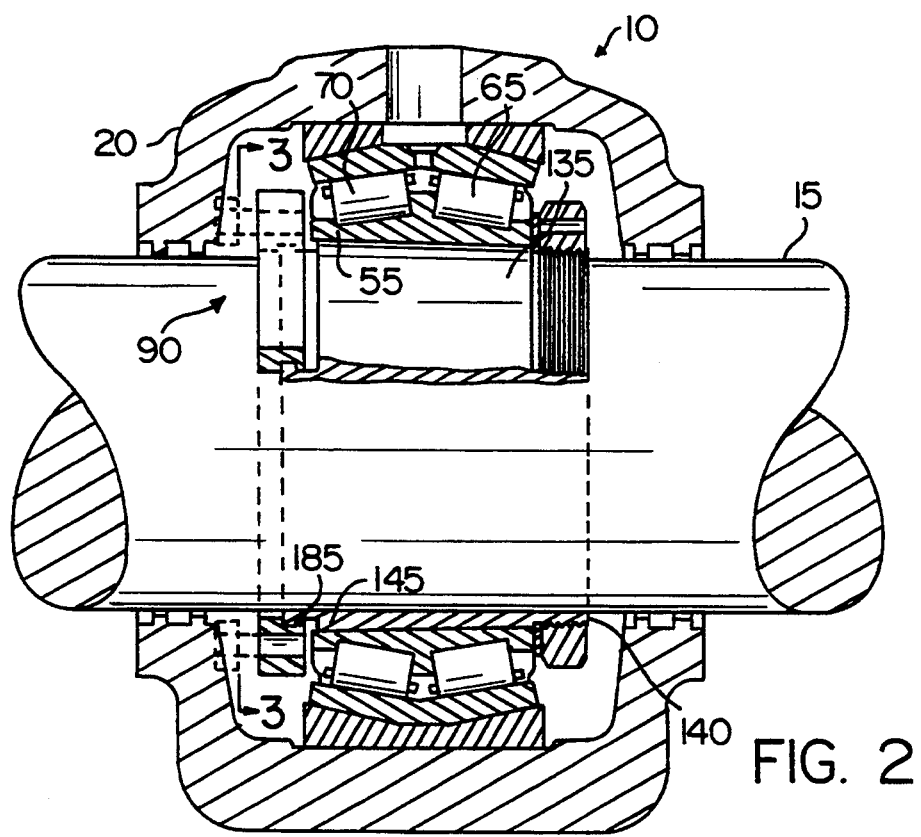
FIG. 2 illustrates a shaft and bearing arrangement utilizing the tapered adapter of the present invention and illustrating the removal tool as it would be placed in use.

Referring to FIG. 2, a tapered adapter 135 in accordance with the present invention includes a groove 185 extending about at least a portion of the circumference of the adapter. As illustrated in FIG. 2, groove 185 is located proximate the second end of the tapered adapter 135 and in a position past (to the left in FIG. 2) where the bearing assembly 25 is normally located when it is properly seated. In a preferred embodiment, groove 185 extends around the entire circumference of tapered adapter 135.

Figure 3:
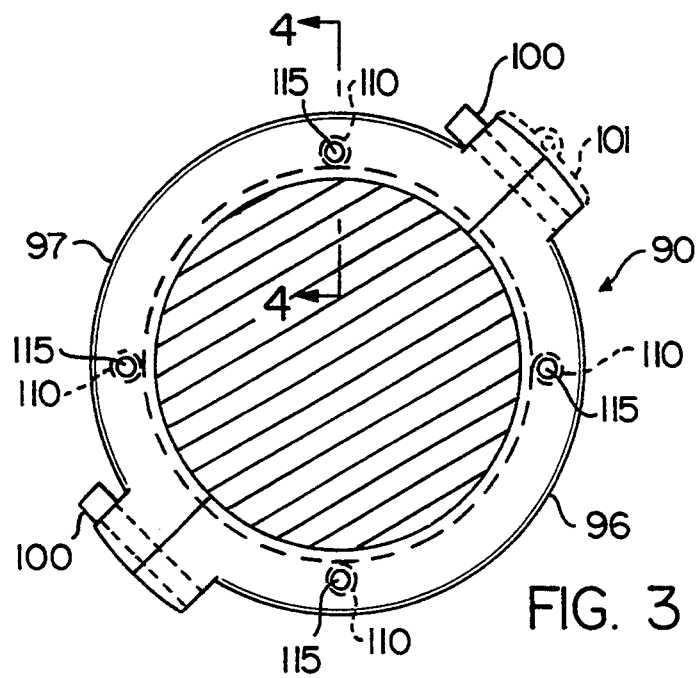
FIG. 3 is a cross-sectional view of FIG. 2 taken along lines 3—3 of the removal tool of the present invention in use.
Figure 4:
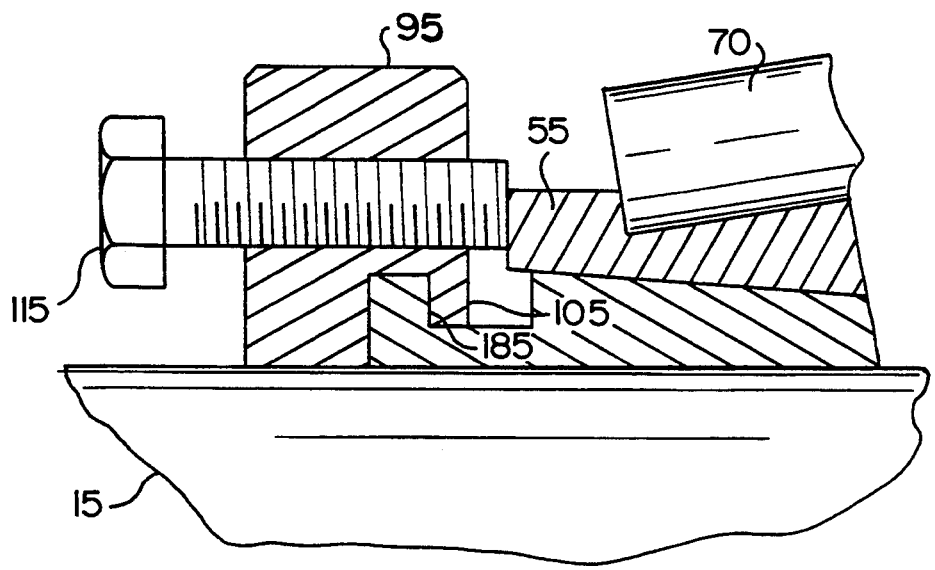
FIG. 4 is a cross-sectional view of FIG. 3 taken along lines 4—4.

As illustrated in FIG. 2, a removal tool 90 is provided for assisting in the removal of the tapered adapter 135 from the bearing assembly 25. Referring to FIGS. 2–4, removal tool 90 includes a removal ring 95 that includes a plurality of segments 96, 97 that are adapted to be secured together into a rigid member for use. The segments may be secured together by bolts 100 or any other suitable means, such as hinged or the like. For example, FIG. 3 illustrates a hinge 101 which may be used for this purpose.

As best illustrated in FIG. 4, removal ring 95 includes a holding lip 105 for mating with groove 185 in tapered adapter 135. Removal ring 95 also includes means for applying a separating force between the removal ring and the bearing assembly to release the bearing assembly from the tapered adapter. As embodied herein, the means for applying a separating force includes a plurality of threaded holes 110 defined therein for receipt of a plurality of threaded members 115. Threaded holes 110 are located in removal ring 95 so that when threaded members 115 are threaded therethrough, they will contact inner ring 55 of bearing assembly 25. As set forth above, groove 185 is located in tapered adapter 135 in a position such that when bearing assembly 25 is seated on the tapered adapter and shaft, a sufficient portion of the groove will remain open so that the holding lip 105 of removal ring 95 can be received therein.

In operation, when it is desired to remove the bearing assembly from the shaft, removal ring 95 is placed over the shaft and onto the tapered adapter with the holding lip 105 mating with groove 185 of the tapered adapter. Threaded members 115 are then moved into engagement with inner ring 55 of the bearing assembly and thereafter further rotated to force the tapered adapter and bearing assembly apart. Once the press fit between the tapered adapter and bearing assembly is released, the bearing assembly can be removed by hand.

While the threaded members are illustrated for providing a separating force between the tapered adapter and bearing assembly, one skilled in the art should understand that fluid actuated means could be provided in place of the threaded members to provide the separating force. Such fluid actuating means could be hydraulic or pneumatic. In addition, electrical drive means to provide the separating force could also be provided as could any device for providing a separating force thereto.

The present invention is also embodied in an improved method for removing the bearing assembly such as the bearing assembly illustrated at 25 from a shaft where the bearing assembly is secured to the shaft through a tapered adapter with a groove as illustrated at 85. The method includes the steps of placing removal ring 95 with holding lip 105 onto second end 145 of tapered adapter 135. The method includes the further step of applying a separating force between removal ring 95 and bearing assembly 25 to force the tapered adapter and bearing assembly apart. The means for applying the separating force may include threaded members 115 and threaded holes 110 wherein the threaded holes 110 are located so that threaded members 115 received therethrough will engage the inner ring 55 of bearing assembly 25 and wherein the step of applying a separating force further includes the steps of providing a plurality of threaded members 115 in threaded holes 110 and rotating threaded members 115 into contact with bearing assembly 25. The method also includes the step of further rotating the threaded members 115 to release the tapered adapter from its press fit with the bearing assembly 25.

In a preferred embodiment, the threaded members are rotated in a predetermined sequence to provide the releasing force between the removal ring and the bearing assembly. Such, for example, could be accomplished by small rotations of threaded members 115 that are adjacent one another on the face of removal ring 95. The method further includes the step of placing the multi-part ring over the shaft and onto the groove 185 and securing the ring together to form a rigid removal ring 95.

While the preferred embodiments have been described, modifications and variations to the present invention may be practiced by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. An improved device for removing a bearing assembly from a shaft, said device comprising:
    a tapered adapter for receipt on a shaft for securing a bearing assembly with a tapered bore to said shaft, said tapered adapter including a first end of lesser diameter and a second end of greater diameter than the diameter of said first end, said first and second ends having a tapered outer surface extending therebetween for contacting said tapered bore, said tapered adapter defining a radial opening therethrough extending along the length thereof and further defining a groove extending about at least a portion of the circumference of said adapter, said groove being located proximate said second end of said adapter;
    a removal ring comprising a plurality of segments adapted to be secured together into a rigid member, each of said plurality of segments defining an arcuate shaft receiving portion arranged so that when said removal ring is secured together said segments define a circular shaft receiving interior, said ring including a holding lip for mating with the groove extending about the circumference of the tapered adapter; and
    means for applying a separating force between said removal ring and said bearing assembly whereby the bearing assembly will be released from the tapered adapter.

2. An improved device as set forth in claim 1 above, wherein said groove extends about the entire circumference of the adapter.

3. An improved device as set forth in claim 1 above, wherein said segments of said removal ring are fastened together.

4. An improved device for removing a bearing assembly from a shaft, said device comprising:
    a tapered adapter for receipt on a shaft for securing a bearing assembly to said shaft, said tapered adapter including a first end of lesser diameter and a second end of greater diameter than the diameter of said first end, said first and second ends having a tapered outer surface extending therebetween, said adapter defining a radial opening therethrough extending along the length thereof and further defining a groove extending about at least a portion of the circumference of said adapter, said groove being located proximate said second end of said adapter;
    a removal ring comprising a plurality of segments adapted to be secured together into a rigid member, said ring including a holding lip for mating with the groove extending about the circumference of the tapered adapter;
    means for applying a separating force between said removal ring and said bearing assembly whereby the bearing assembly will be released from the tapered adapter, wherein said segments of said removal ring are hinged together.

5. An improved device for removing a bearing assembly from a shaft, said device comprising:
    a tapered adapter for receipt on a shaft for securing a bearing assembly to said shaft, said tapered adapter including a first end of lesser diameter and a second end of greater diameter than the diameter of said first end, said first and second ends having a tapered outer surface extending therebetween, said tapered adapter defining a radial opening therethrough extending along the length thereof and further defining a groove extending about at least a portion of the circumference of said tapered adapter, said groove being located proximate said second end of said tapered adapter;
    a removal ring comprising a plurality of segments adapted to be secured together into a rigid member, each of said plurality of segments defining an semicircular shaft receiving portion arranged so that when said removal ring is secured together said segments define a circular shaft receiving interior, said ring including a holding lip for mating with the groove extending about the circumference of the tapered adapter;
    means for applying a separating force between said removal ring and said bearing assembly whereby the bearing assembly will be released from the tapered adapter, wherein said bearing assembly includes an inner ring and said means for applying a separating force includes:
    a plurality of threaded holes defined in said removal ring for receipt of a plurality of threaded members therethrough, said holes being located so that threaded members received therethrough will engage the inner ring of the bearing assembly;

a plurality of threaded members threadingly engaged in said holes so that said removal ring can be placed on a tapered adapter with the holding lip engaging the groove and said threaded members rotated into engagement with the inner ring and thereafter further rotated so that the removal ring will cause the tapered adapter to disengage the bearing assembly.

6. A tapered adapter for receipt on a shaft for securing a bearing assembly to the shaft, said tapered adapter comprising:

a first end of less diameter and a second end of greater diameter than the diameter of said first end, said first and second ends having a tapered outer surface extending therebetween for contacting a tapered bore on the bearing assembly, said tapered adapter defining a radial opening therethrough extending along the length thereof, wherein said first end defines threads therearound for a portion of the length of the adapter;

a groove extending around at least a portion of the circumference of said adapter, said groove being defined between said second end of said adapter and an annular flange integral therewith so that said groove can be engaged by a lip of a removal ring to assist in the separation of the bearing assembly from the tapered adapter when desired, said lip having a predetermined axial width and said groove having an axial width greater than the axial width of said lip in an amount sufficient to allow said lip to be received in said groove even if a portion of said bearing assembly extends over said groove when said bearing assembly is seated on said tapered adapter.

7. A tool for removing a bearing assembly from a shaft to which the bearing assembly is secured through a tapered adapter with a groove therein, said tapered adapter mating with a tapered bore on said bearing assembly, said tool comprising:

a removal ring comprising a plurality of segments adapted to be secured together into a rigid member, each of said plurality of segments defining an arcuate shaft receiving portion arranged so that when said removal ring is secured together, said segments define a circular shaft receiving interior, said ring including a holding lip for mating with a groove extending about the circumference of a tapered adapter; and means for applying a separating force between said removal ring and said bearing assembly whereby the bearing assembly will be released from the tapered adapter.

8. A tool for removing a bearing assembly as set forth in claim 1 above, wherein said bearing assembly includes an inner ring and said means for applying a separating force includes:

a plurality of holes defined in said removal ring for receipt of a plurality of threaded members therethrough, said holes being located so that threaded members received therethrough will engage the inner ring of the bearing assembly; and a plurality of threaded members threadingly engaged in said holes so that said removal ring can be placed on the tapered adapter with the holding lip engaging the groove and said threaded members rotated into engagement with the inner ring and thereafter further rotated so that the removal ring will cause the tapered adapter to disengage the bearing assembly.

9. A tool as set forth in claim 8 above, wherein said groove extends around the entire circumference of the adapter.

10. A tool as set forth in claim 8 above, wherein said segments of said removal ring as fastened together.

11. A tool for removing a bearing assembly from a shaft to which the bearing assembly is secured through a tapered adapter with a groove therein, said tool comprising:

a removal ring comprising a plurality of segments adapted to be secured together into a rigid member, said ring including a holding lip for mating with a groove extending about the circumference of a tapered adapter, wherein said segments of said removal ring are hinged together;

means for applying a separating force between said removal ring and said bearing assembly whereby the bearing assembly will be released from the tapered adapter, wherein said means for applying a separating force includes;

a plurality of threaded holes defined in said removal ring for receipt of a plurality of threaded members therethrough, said holes being located so that threaded members received therethrough will engage the inner ring of the bearing assembly; and a plurality of threaded members threadingly engaged in said holes so that said removal ring can be placed on a tapered adapter with the holding lip engaging the groove and said threaded members rotated into engagement with the inner ring and thereafter further rotated so that the removal ring will cause the tapered adapter to disengage the bearing assembly.

12. An improved method for removing a bearing assembly from a shaft where the bearing assembly is secured to the shaft through a tapered adapter, the tapered adapter having a first end of lesser diameter and a second end of greater diameter than the diameter of the first end, the first and second ends having a tapered outer surface extending therebetween for contacting a tapered bore in said bearing assembly, and the adapter defining a groove extending about at least a portion of its circumference and located proximate the second end of the tapered adapter, said method comprising the steps of:

providing a removal ring comprising a plurality of segments adapted to be secured together into a rigid member, each of said plurality of segments defining an arcuate shaft receiving portion arranged so that when said removal ring is secured together, said segments define a circular shaft receiving interior, said ring including a holding lip for mating with the groove extending about the circumference of the tapered adapter;

assembling the removal ring onto the second end of said tapered adapter so that the shaft receiving interior of the removal ring circumferentially extends about the shaft and the holding lip mates with the groove defined in the tapered adapter; and applying a separating force between the removal ring and the bearing assembly to force the tapered adapter and bearing assembly apart.

13. A method as set forth in claim 12, wherein said bearing assembly includes an inner ring and said removal ring includes a plurality of threaded holes defined therein for receipt of a plurality of fastening members therethrough, said holes being located so that threaded members received therethrough will engage the inner ring of the bearing assembly, and wherein the step of applying a separating force between the removal ring and the bearing assembly further includes the steps of:
  providing a plurality of threaded members in said threaded holes in said removal ring;
  rotating said threaded members into contact with said bearing assembly; and
  further rotating said threaded members to force said tapered adapter out of engagement with said bearing assembly.

14. The method as set forth in claim 13 above, wherein the threaded members are rotated individually.

15. The method as set forth in claim 12 above, wherein said removal ring comprises a plurality of segments and the step of placing the removal ring onto the tapered adapter includes the step of placing the individual segments of the removal ring onto the adapter and securing them together to form a rigid unitary removal ring.

* * * * *

UNITED STATES PATENT AND TRADEMARK OFFICE
CERTIFICATE OF CORRECTION

PATENT NO. : 5,373,636

DATED : December 20, 1994

INVENTOR(S) : Martinie

It is certified that error appears in the above-identified patent and that said Letters Patent is hereby corrected as shown below:

In Claim 8, Column 7, Line 53, please delete "1" and insert --7--.

Signed and Sealed this

Eighteenth Day of April, 1995

Attest:

BRUCE LEHMAN

Attesting Officer

Commissioner of Patents and Trademarks